(12) United States Patent
Katano

(10) Patent No.: US 8,218,255 B2
(45) Date of Patent: Jul. 10, 2012

(54) RETRACTABLE LENS BARREL UNIT

(75) Inventor: Kenichi Katano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/840,790

(22) Filed: Jul. 21, 2010

(65) Prior Publication Data

US 2011/0026143 A1 Feb. 3, 2011

(30) Foreign Application Priority Data

Jul. 30, 2009 (JP) ................................. 2009-177266

(51) Int. Cl.
*G02B 7/02* (2006.01)
(52) U.S. Cl. .......................... 359/817; 359/815; 359/819
(58) Field of Classification Search .................. 359/700, 359/811, 813, 819–824
See application file for complete search history.

(56) References Cited

U.S. PATENT DOCUMENTS

| 6,987,929 | B2 | | 1/2006 | Nomura |
| 7,085,487 | B2 | | 8/2006 | Nomura |
| 7,373,082 | B2 | * | 5/2008 | Yamazaki et al. ............... 396/72 |
| 2009/0040369 | A1 | * | 2/2009 | Miyoshi ........................ 348/374 |

FOREIGN PATENT DOCUMENTS

| CN | 101363951 A | 2/2009 |
| JP | 2004-085934 | 3/2004 |

OTHER PUBLICATIONS

The above reference was cited in a Feb. 29, 2012 Chinese Office Action, a copy of which is enclosed with English Translation, that issued in Chinese Patent Application No. 201010232818.8.

* cited by examiner

*Primary Examiner* — Ricky Mack
*Assistant Examiner* — Brandi Thomas
(74) *Attorney, Agent, or Firm* — Cowan, Liebowitz & Latman, P.C.

(57) ABSTRACT

A lens barrel unit includes a holder configured to hold a lens, a cam cylinder including a cam groove configured to engage with the holder and define a movement of the holder in an optical axis direction, and a projection that has a part of the cam groove and projects in the optical axis direction, and a straightforward movement cylinder configured to guide a straightforward movement of the holder, the straightforward movement cylinder including a flange forming a notch. In a process from a retraction state in which the projection is located in the notch to an image pickup state in which the projection is located outside of the notch, the straightforward movement cylinder moves relative to the cam cylinder in the optical axis direction.

2 Claims, 8 Drawing Sheets

RETRACTABLE LENS BARREL UNIT

BACKGROUND OF THE INVENTION

1. Field of the Invention

The present invention relates to a lens barrel unit.

2. Description of the Related Art

Japanese Patent Laid-Open No. ("JP") 2004-085934 discloses in its embodiment a lens barrel including a cam cylinder having a pair of cam grooves, and a straightforward movement cylinder having a pair of cam followers, wherein the pair of cam grooves are crossed. In this lens barrel, each cam follower is engaged with the corresponding cam groove at the retraction time, but the rear cam follower is engaged with the forward cam groove and the forward cam follower escapes from the cam groove at the image pickup time. Thus, this lens barrel unit can set a movement amount of a lens unit guided by the cam follower to a value larger than a length of the cam cylinder in an optical axis direction.

However, the lens barrel unit disclosed in JP 2004-085934 causes an unstable movement of the lens, since one cam follower escapes from the cam groove at the image pickup time.

SUMMARY OF THE INVENTION

The present invention provides a lens barrel unit that can maintain a stable movement of the lens unit and a small configuration.

A lens barrel unit according to one aspect of the present invention includes a holder configured to hold a lens, a cam cylinder including a cam groove configured to engage with the holder and define a movement of the holder in an optical axis direction, and a projection that has a part of the cam groove and projects in the optical axis direction, and a straightforward movement cylinder configured to guide a straightforward movement of the holder, the straightforward movement cylinder including a flange forming a notch. In a process from a retraction state in which the projection is located in the notch to an image pickup state in which the projection is located outside of the notch, the straightforward movement cylinder moves relative to the cam cylinder in the optical axis direction.

Further features of the present invention will become apparent from the following description of exemplary embodiments with reference to the attached drawings.

DESCRIPTION OF THE EMBODIMENTS

Figure 1:
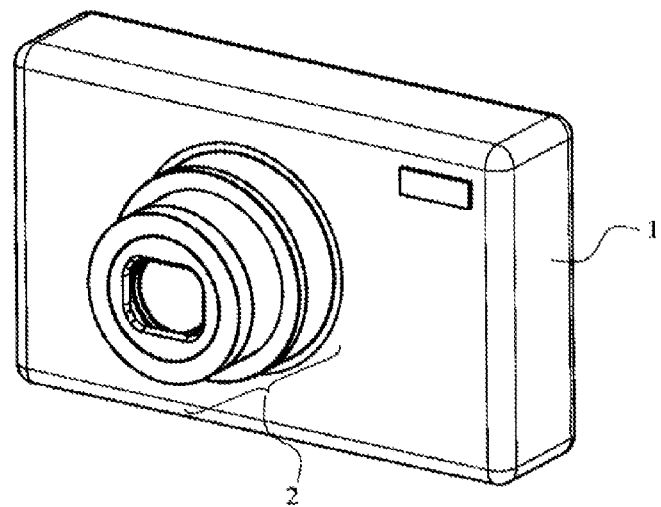
FIG. 1 is a perspective view of an image pickup apparatus according to this embodiment.

FIG. 1 is a perspective view of an image pickup apparatus (digital camera) 1 of this embodiment. As illustrated in FIG. 1, the camera 1 includes a camera body 1 and a lens barrel unit 2. The lens barrel unit 2 is a retractable barrel configured to project from the camera body 1 at an image pickup time and to retract into the camera body 1 at a non-image pickup time.

Figure 2:
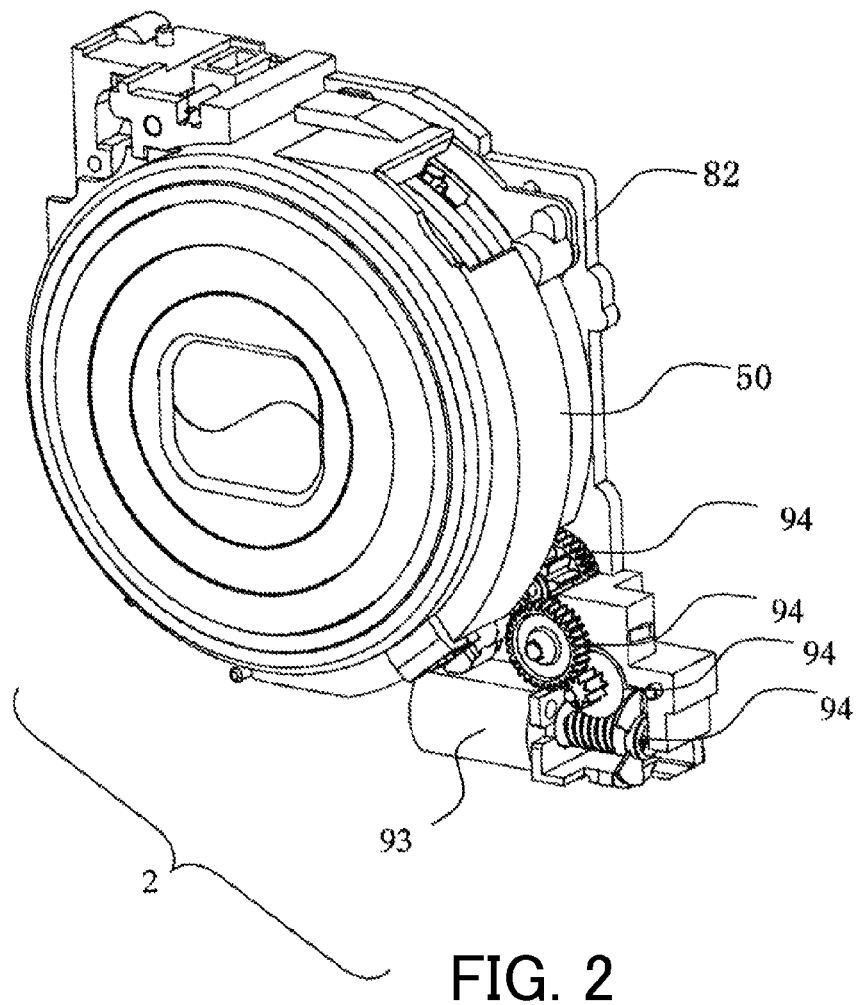
FIG. 2 is a perspective view of a lens barrel unit illustrated in FIG. 1.
Figure 3:
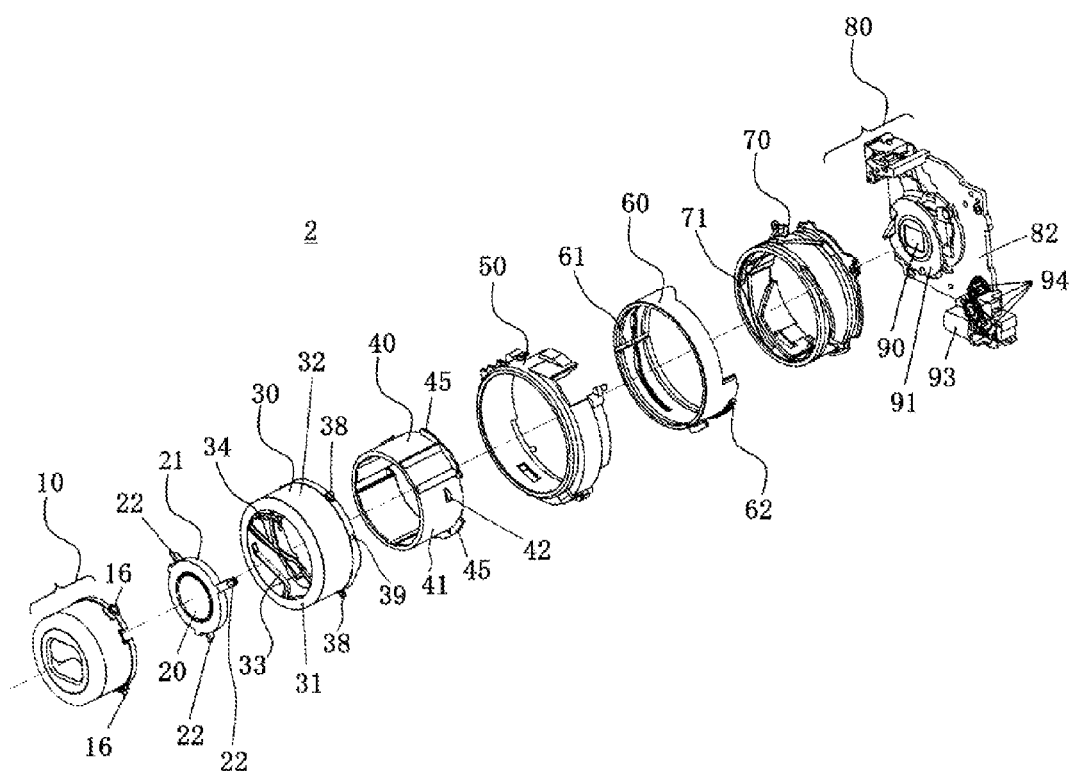
FIG. 3 is an exploded perspective view of the lens barrel unit illustrated in FIG. 2.
Figure 4:
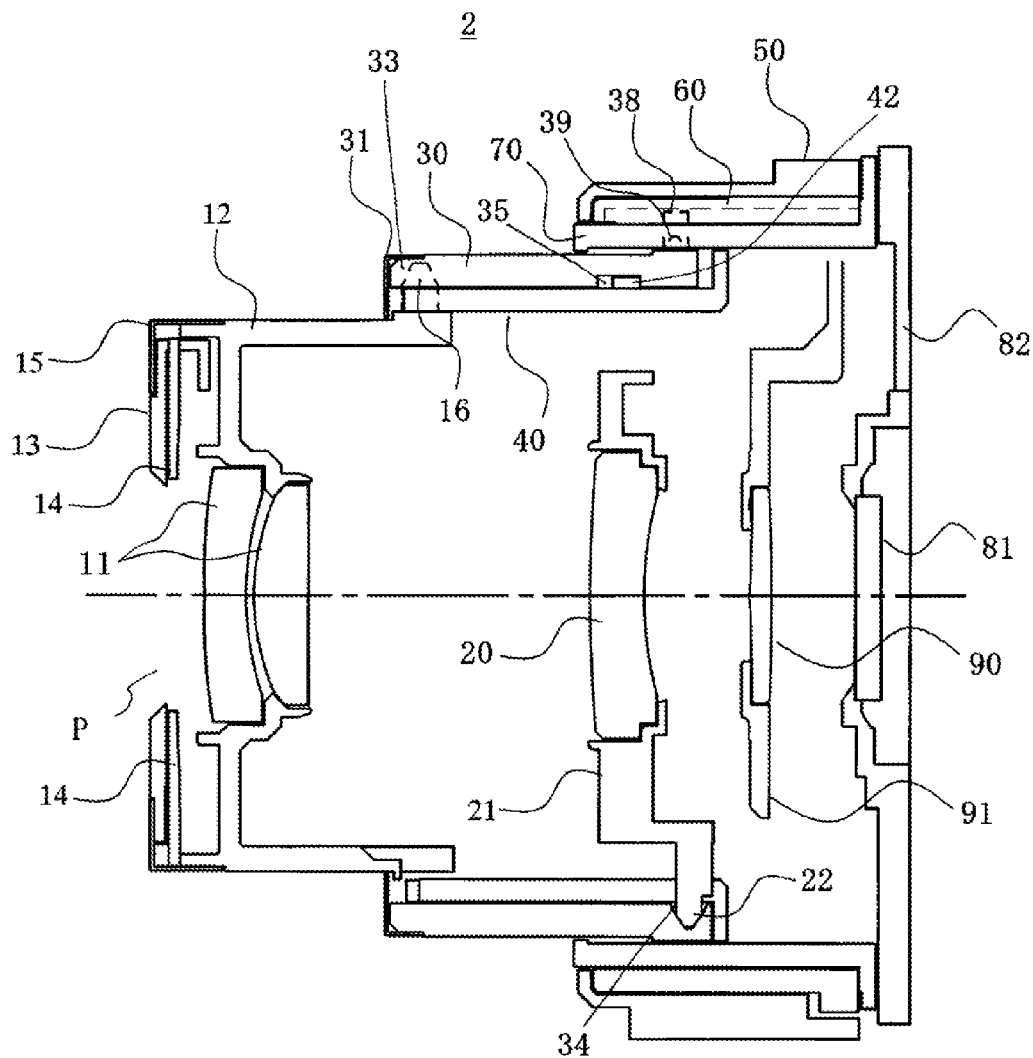
FIG. 4 is a section view of the lens barrel unit illustrated in FIG. 2 in an image pickup state.
Figure 5:
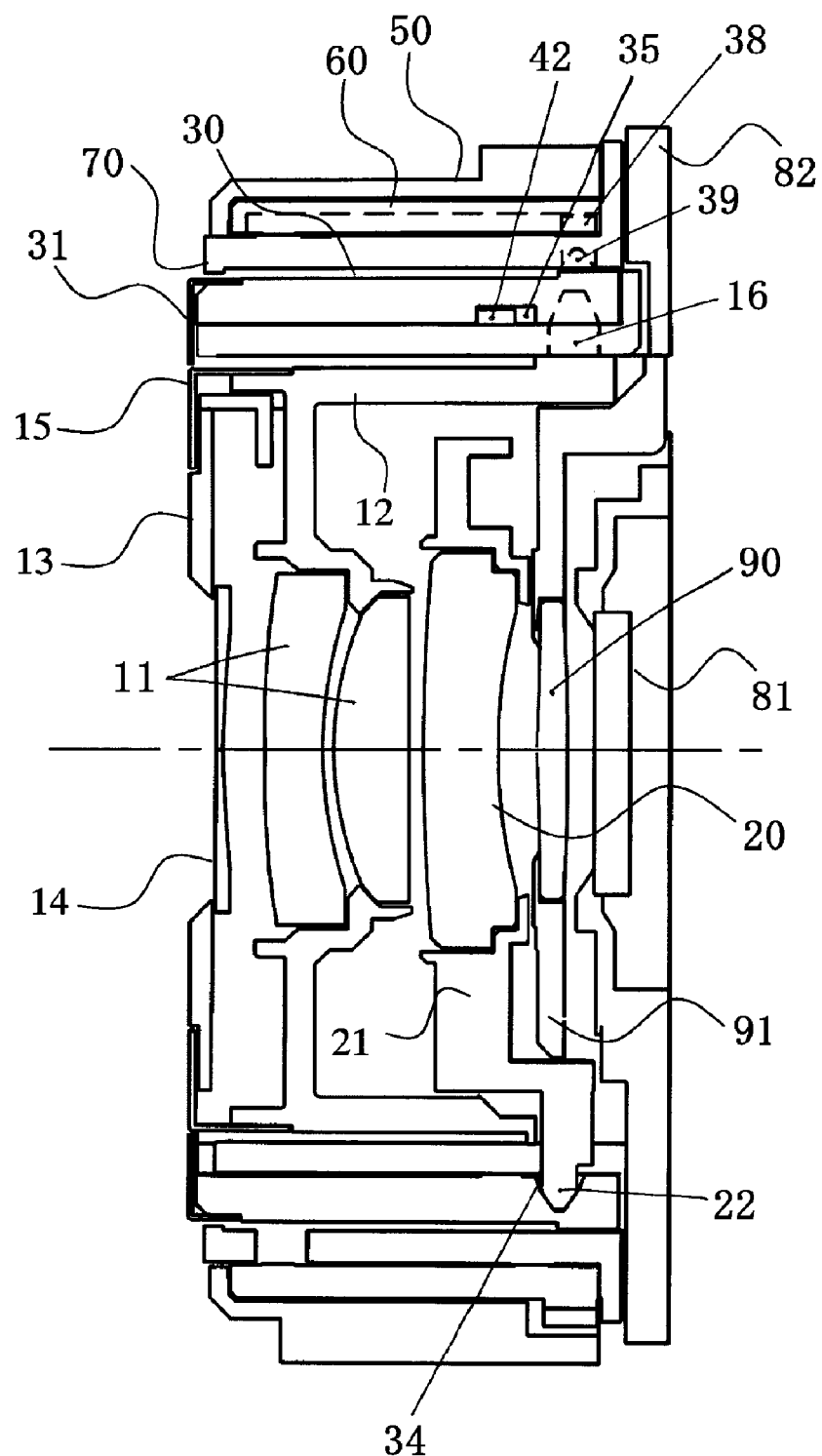
FIG. 5 is a sectional view of the lens barrel unit in FIG. 2 in a retraction state.

FIG. 2 is a perspective view of the lens barrel unit 2. FIG. 3 is an exploded perspective view of the lens barrel unit 2. FIG. 4 is a sectional view of the lens barrel unit 2 at the image pickup state. FIG. 5 is a sectional view of the lens barrel unit 2 at the retraction state.

The lens barrel unit 2 is of a two-step retractable type including a first cylinder unit 10, a second cylinder unit, and a third cylinder unit, and can change its length in the optical axis direction illustrated by an alternate long and short dash line in FIGS. 3-5 between the image pickup time and the retraction time. The lens barrel unit 2 includes an image pickup lens group including three groups, i.e., a first lens 11, a second lens 20, and a third lens 90. The first lens 11 is held by a first cylinder 12 of the first cylinder unit 10, the second lens 20 is held by a second holder 21 of the second cylinder unit, and the third lens 90 is held by a third holder 91 of the third cylinder unit.

The first cylinder unit 10 includes a first cylinder 12, a first cover 13, barrier blades 14, and a first cap 15. Three cam pins 16 project in the radial direction at regular intervals of 120° at the outer circumferential end of the first cylinder 12. Each cam pin 16 is engaged with a cam groove 33 of a cam cylinder 30, which will be described later. The barrier blade 14 is linked with an operation of the lens barrel unit 2, and opens an aperture P in the image pickup state illustrated in FIG. 4 and closes the aperture P in the retraction state illustrated in FIG. 5.

The second cylinder unit includes a cam cylinder 30 and a straightforward movement cylinder 40 that are bayonet-coupled with each other, and the cam cylinder 30 is engaged with the second holder 21. Three cam pins 22 project in the radial direction around the outer circumference of the second holder 21 at regular intervals of 120°, and each cam pin 22 is engaged with a cam groove 34 of the cam cylinder 30, which will be described later. Shapes of the cam grooves 34 engageable with the cam pins 22 define a movement of the second holder 21 in the optical axis direction. In addition, due to the bayonet coupling, the cam cylinder 30 and the straightforward movement cylinder 40 move together in the optical axis direction.

Figure 6:
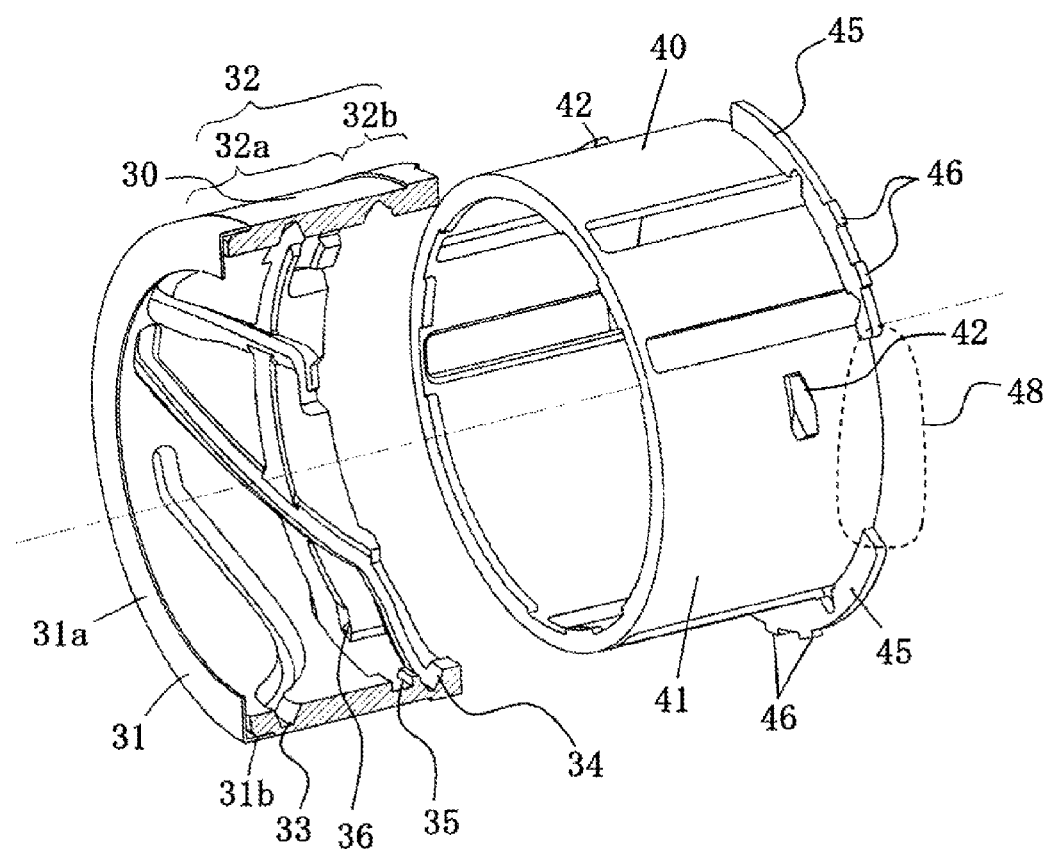
FIG. 6 is a perspective view of a cam cylinder and a straightforward movement cylinder in the lens barrel unit illustrated in FIG. 1.
Figure 7:
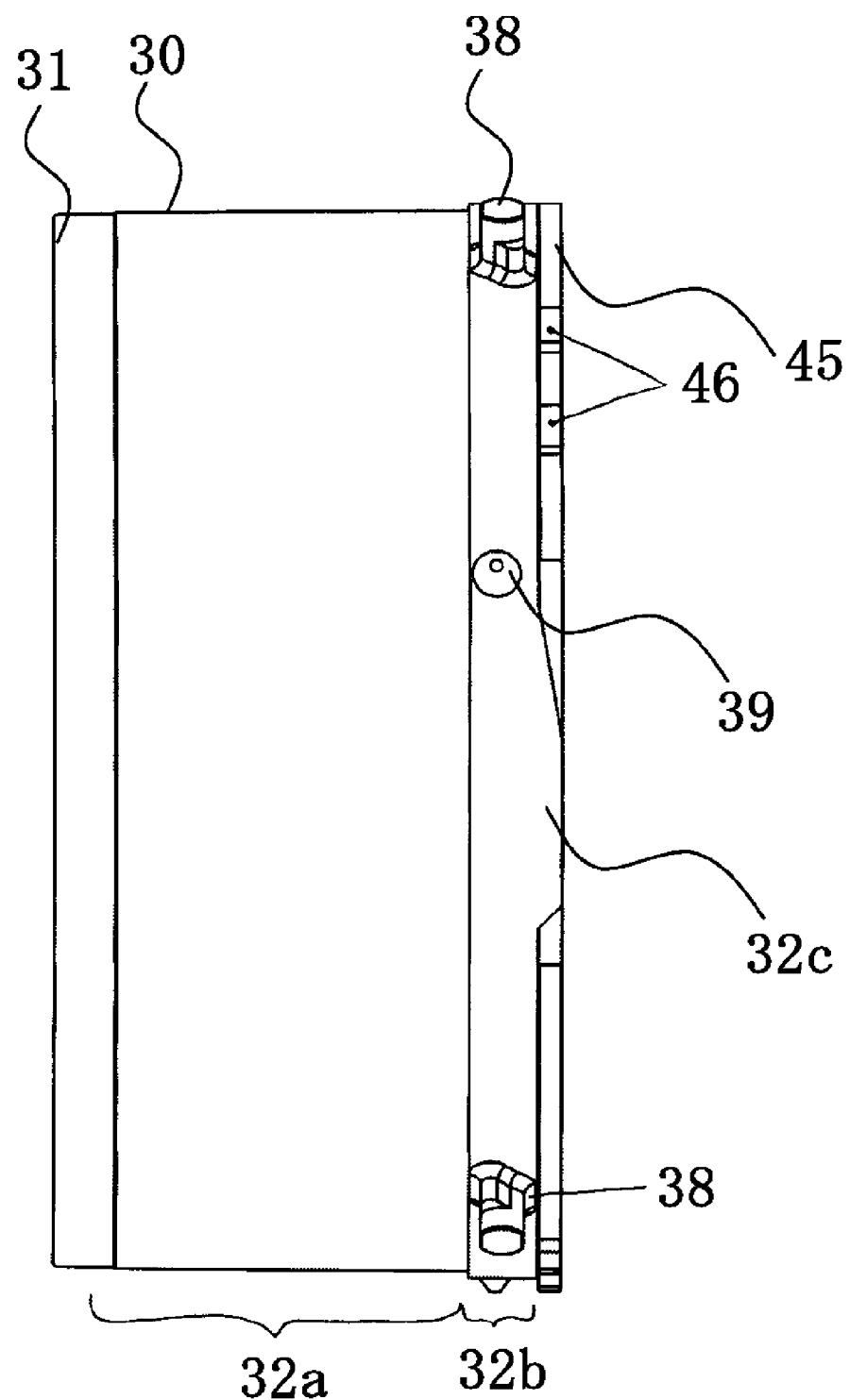
FIG. 7 is a side view of the cam cylinder and the straightforward movement cylinder illustrated in FIG. 6 in the retraction state.
Figure 8:
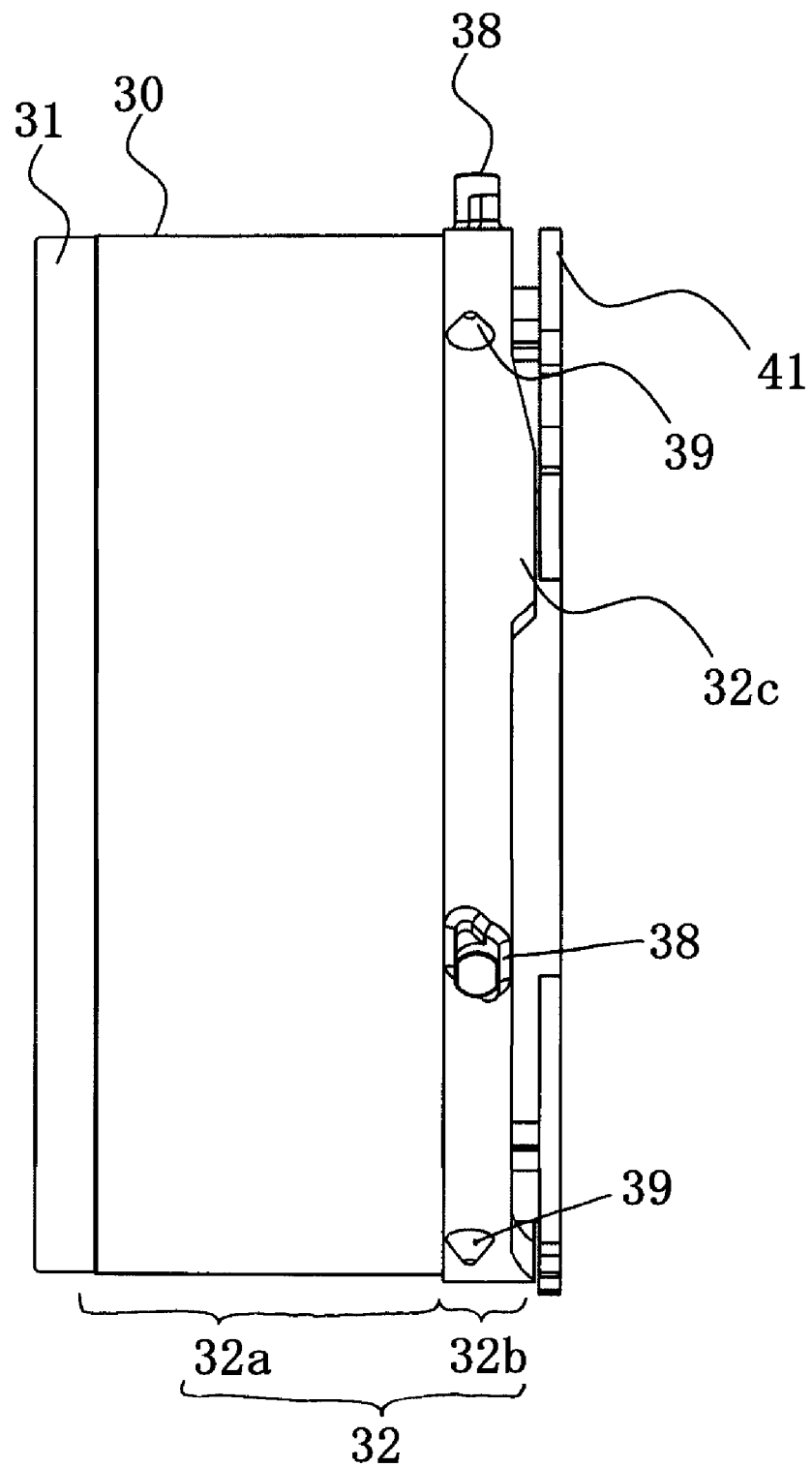
FIG. 8 is a side view of the cam cylinder and the straightforward movement cylinder illustrated in FIG. 6 in the image pickup state.

FIG. 6 is an enlarged perspective view of the cam cylinder 30 and the straightforward movement cylinder 40, in which a part of the cam cylinder 30 is ruptured. FIG. 7 is a side view of the cam cylinder 30 and the straightforward movement cylinder 40 in the retraction state, and FIG. 8 is a side view of the cam cylinder 30 and the straightforward movement cylinder 40 in the image pickup state.

The cam cylinder 30 includes, as illustrated in FIG. 6, a cap 31 and a cylinder body 32.

The cap 31 has an L-shaped section, and is provided at the head of the cam cylinder 30 on the side of the first cylinder unit 10. The cap 31 includes a front 31a that covers a top surface of the cylinder body 32 on the side of the first cylinder unit 10, and a side 31b that covers a part of a side surface of the cylinder body 32 on the side of the first cylinder unit 10.

The cylinder body 32 includes a center 32a, a rim 32b, and a projection 32c.

The center 32a has a step at the end of its side surface on the side of the first cylinder unit 10, to which the side 31b of the cap 31 is attached. Thereby, an outer surface of the side 31b can be level with an outer surface of the center 32a of the cylinder body 32.

Figure 9:
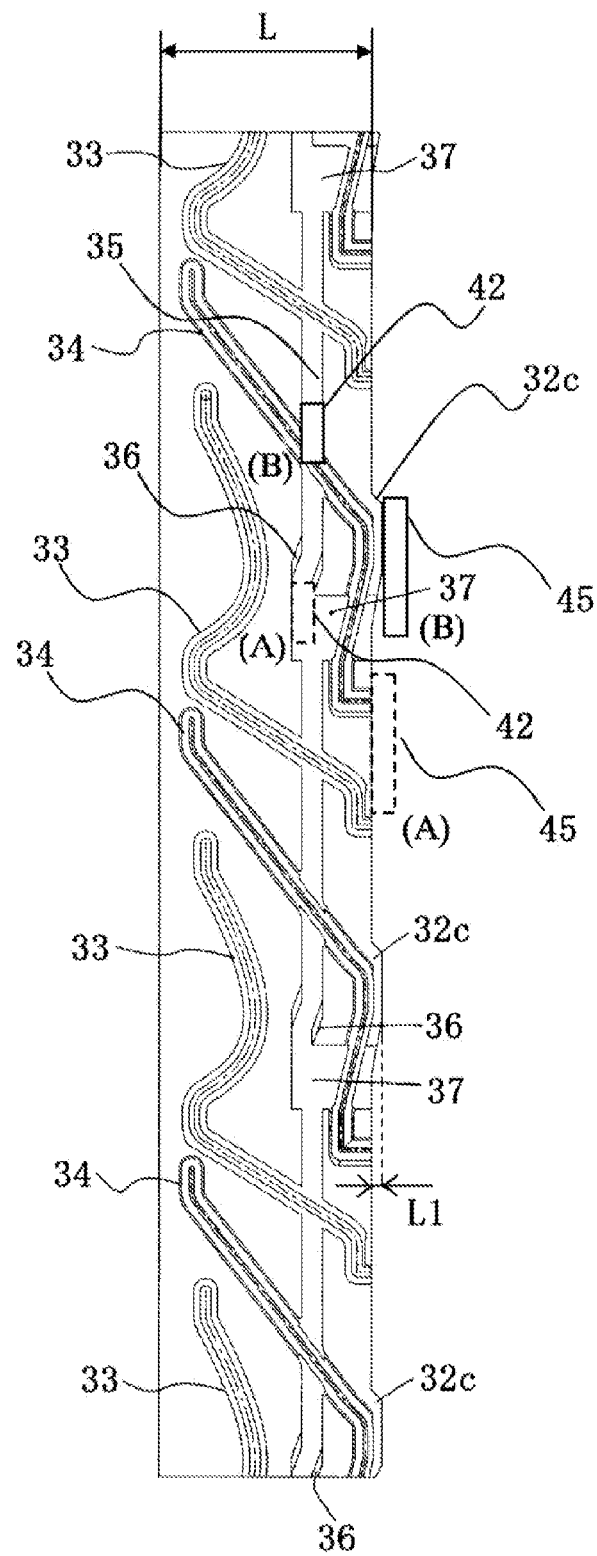
FIG. 9 is a developed view of the cam cylinder illustrated in FIG. 6.

FIG. 9 is a plane view made by developing an inner surface of the cylinder body 32 of the cam cylinder 30 in the circumferential direction. As illustrated in FIG. 9, the inner surface of the cylinder body 32 has three cam grooves 33 and three cam grooves 34 in the circumferential direction. In addition, the inner surface of the cylinder body 32 has an engagement groove 35 that extends over the circumference.

Each cam pin 16 of the first cylinder unit 10 is engaged with the corresponding cam groove 33, and the cam grooves 33 define (control) a movement (amount) of the first cylinder unit 10 relative to the second holder in the optical axis direction. Each cam pin 22 of the second holder 21 is engaged with the corresponding cam groove 34, and the cam grooves 34 define (control) a movement (amount) of the second holder 21 in the optical axis direction. The first cylinder unit 10 and the second holder 21 can move back and forth in the optical direction due to the rotations of the cam cylinder 30 and the rotational restrictions of the straightforward movement cylinder 40. The cam grooves 33 and 34 have different shapes and are arranged so that they cannot overlap each other. A part of the cam groove 34 extends in the projection 32c.

The engagement groove 35 extends in the circumferential direction of the cylinder body 32 perpendicularly to the optical axis direction, and partially includes inclination grooves 36 and home sections 37 arranged at regular intervals of 120°. The engagement groove 35 is engaged with engagement members of the straightforward movement cylinder 40, which will be described later. In order to change a distance between the cam cylinder 30 and the straightforward movement cylinder 40 in the optical axis direction, the inclination groove 36 inclines relative to or is not parallel to the circumferential direction (longitudinal direction) illustrated in FIG. 9, differently from the engagement groove 35.

The rim 32b is provided on the cylinder body on the side of the third cylinder unit, projects higher than the center 32a in the radial direction, forming a step. The cam groove 33 is provided on the inner surface of the center 32a, but a part of the cam groove 34 extends to a part of the end 32b as illustrated in FIG. 6 (and to the projection 32c as illustrated in FIG. 9).

Three drive pins 38 are provided on the outer circumference surface of the rim 32b at regular intervals of 120°, and three cam pins 39 are provided on the outer circumference surface of the rim 32b at regular intervals of 120°. Each drive pin 38 is engaged with a corresponding key groove 61 of the rotary cylinder 60, and the cam cylinder 30 rotates with the rotary cylinder 60. Each cam pin 39 is engaged with a corresponding cam groove 71 of the fixture cylinder 70, and the cam cylinder 30 moves in the optical axis direction following the locus of the cam groove 71.

Three projections 32c project in the optical direction from the end of the rim 32b toward the third cylinder unit. Each projection 32c can be inserted into and escape from a corresponding notch 48 of the straightforward movement cylinder 40. As illustrated in FIG. 9, a part of the cam groove 34 is formed in each projection 32c. In FIG. 9, the projection 32c has an approximately trapezoidal shape and a length of the cam cylinder 30 except for the projection 32c is L in the optical axis direction as illustrated. This embodiment shortens the length of the cam cylinder 30 in the optical axis direction (or the length of the lens barrel unit 2) by the length of the projection 32c, i.e., L1 shown in FIG. 9.

The straightforward movement cylinder 40 is configured to guide a straightforward movement of the second holder 21 (or the lens 20). In addition, the straightforward movement cylinder 40 is configured to move in the optical axis direction in association with the operation of the cam cylinder 30, and to restrict a rotation of the first cylinder 12 and the second holder 21. The straightforward movement cylinder 40 includes a cylinder body 41, a plurality of (three in this embodiment) flanges 45 formed at the end of the cylinder body 41 on side of the third cylinder unit and projecting to the outside of the cylinder body 41 in the radial direction, and three notches 48 formed among these three flanges 45. The flanges 45 are spaced due to these notches 48.

The cylinder body 41 is inserted into the cam cylinder 30. Three engagement members 42 project and are arranged at regular intervals of 120° on the outer circumferential surface of the cylinder body 41, and each engagement member 42 is engaged with the corresponding engagement groove 35 of the cam cylinder 30. Due to this engagement, the cam cylinder 30 and the straightforward movement cylinder 40 move together in the optical axis direction. As described above, when the engagement members 42 of the straightforward movement cylinder 40 are guided by the engagement groove 35 having the inclination grooves 36, an arrangement changes in the optical axis direction between the cam cylinder 30 and the straightforward movement cylinder 40.

The flange 45 has three pairs of straightforward movement keys 46 configured to engage with the fixture cylinder 70 and to restrict a rotation of the fixture cylinder 70. While the thickness of the flange 45 in the optical axis direction corresponds to the length of the above projection 32c in this embodiment, they do not have to be equal to each other.

The third cylinder unit includes a cover cylinder 50, a rotary cylinder 60, a fixture cylinder 70, and an image pickup device unit 80. The cover cylinder 50 and the rotary cylinder 60 are arranged outside of the fixture cylinder 70. The image pickup device unit 80 includes an image pickup device 81, a third holder 91, a motor 93, etc.

The cover cylinder 50 is fixed with the rotary cylinder 60 and a holder 82 configured to hold the image pickup device 81, and held on the camera body 1. As illustrated in FIG. 2, the holder 82 holds a motor 93 as a driving source for zooming, and a gear row 94 configured to transmit the power from the motor 93. The gear row 94 is engaged with a gear 62 provided on the outer circumferential surface of the rotary cylinder 60 in the circumferential direction, and the rotary cylinder 60 rotates around the optical axis along the outer circumference of the fixture cylinder 70.

A description will now be given of a retraction and a projection of the lens barrel unit 2.

In the retraction state, as illustrated in FIGS. 5 and 7, each projection 32c of the cam cylinder enters the space as the notch 48 of the straightforward movement cylinder 40. In the retraction state, in FIG. 9, the engagement member 42 and the flange 45 are located in a space (A) illustrated by a dotted line. In other words, the engagement member 42 is located at the home section 37, and the flange 45 is adjacent to the projection 32c in the circumferential direction of the cam cylinder 30. This embodiment shortens the length of the lens barrel unit 2 in the optical axis direction by L1 by inserting the projection 32c into the notch 48.

If there is no projection 32c in FIG. 9, a portion corresponding to the projection 32c of the cam groove 34 discontinues, making an engagement between the cam groove 34 and the cam pin 22 unstable and a movement of the second lens 20 unstable. On the other hand, if the end surface of the cam cylinder 30 on the third cylinder unit side is located at the end surface position illustrated by a dotted line of the projection 32c, the engagement between the cam groove 34 and the cam pin 22 is maintained stable but the length of the cam cylinder 30 in the optical axis direction becomes L+L1 and the miniaturization is hindered.

Next, the retraction state transfers to the image pickup state illustrated in FIGS. 4 and 8. In the image pickup state, the engagement member 42 and the flange 45 are located at a position (B) illustrated by a solid line in FIG. 9. In other words, the engagement member 42 moves to the engagement groove 35, and the flange 45 is adjacent to the projection 32c of the cam cylinder 30 in the optical axis direction. Thereby, the projection 32c is escaped from the space of the notch 48.

The engagement groove 35 extends in the circumferential direction. If the engagement member 42 is located in the engagement groove 35 in the retraction state, the height (position) of the engagement member 42 in the cam cylinder 30 does not change in the optical axis direction in the transfer from the retraction state to the image pickup state. Due to a fixed positional relationship between the engagement member 42 and the flange 45, unless the position of the engagement member 42 changes, the position of the flange 45 does not change, and the flange 45 collides with the projection 32c as the engagement member 42 moves from the dotted line position to the solid line position in FIG. 9.

Accordingly, this embodiment provides the inclination groove 36 that is connected to the engagement groove 35 and inclines relative to the circumferential direction. In the transfer from the retraction state to the image pickup state, the engagement member 42 passes the inclination groove 36 and its position changes in the cam cylinder 30 in the optical axis direction. In the retraction state, the projection 32c having a part of the cam groove 34 of the cam cylinder 30 is located in the space in the notch 48 of the flange 45. On the other hand, in the image pickup state, there is no projection in the space of the notch 48. In FIG. 9, the engagement member 42 moves to the right side by the height of the inclination groove 36 in the optical axis direction in moving from the dotted line position to the solid line position in FIG. 9. As a result, the flange 45 moves to the right side by this height. As a consequence, the cam cylinder 30 and the straightforward movement cylinder 40 can move in the optical axis direction relative to each other. Since the cam cylinder 30 and the straightforward movement cylinder 40 move in the optical axis direction relative to each other, the projection 32c moves ahead of the flange 45 without colliding with the flange 45. This height corresponds to above L1 in this embodiment.

In the transfer from the retraction state to the image pickup state, the engagement between the cam groove 33 and the cam pin 16 and the engagement between the cam groove 34 and the cam pin 22 are maintained. Hence, movements of the lens unit become stable unlike JP 2004-085934 in which the cam pin (cam follower) and the cam groove are disengaged from each other.

While this embodiment allows an engagement between the engagement member 42 and the inclination groove 36, the present invention is not limited to this embodiment and is applicable to another engagement (such as an engagement between the cam groove or use of a ball follower).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The image pickup apparatus includes a retractable lens barrel unit can be applied to the photography of an object.

This application claims the benefit of Japanese Patent Application No. 2009-177266, filed Jul. 30, 2009, which is hereby incorporated by reference herein in its entirety.

What is claimed is:

1. A lens barrel unit comprising:
   a holder configured to hold a lens;
   a cam cylinder including a cam groove configured to engage with the holder and define a movement of the holder in an optical axis direction, and a projection that has a part of the cam groove and projects toward an image-pickup element in the optical axis direction; and
   a straightforward movement cylinder configured to guide a straightforward movement of the holder, the straightforward movement cylinder including a flange on a cylinder and in an end surface of the cylinder in the side of the image-pickup element, the flange forming a notch which notches in a direction perpendicular to the optical axis direction,
   wherein the cam cylinder includes a first engagement groove configured to extend in a circumference direction perpendicular to the optical axis direction, and an inclination groove connected to the first engagement groove and configured to incline relative to the circumference direction,
   wherein the cylinder includes an engagement member configured to engage with the first engagement groove and the inclination groove, and is inserted into the cam cylinder,
   wherein, in a retraction state in which the projection is inserted in the notch, the engagement member is located in the first engagement groove, and
   wherein, when the engagement member moves through the inclination groove in a transfer from the retraction state to an image-pickup state and the projection retracts from the notch.

2. The lens barrel unit according to claim 1, wherein the cam cylinder including a second engagement groove configured to be connected to the inclination groove and to extend in the circumference direction, and
   wherein the engagement member is located in the second engagement groove in the image-pickup state.

* * * * *